US012419469B2

(12) United States Patent
Hammond

(10) Patent No.: US 12,419,469 B2
(45) Date of Patent: Sep. 23, 2025

(54) MASSAGE TOWEL

(71) Applicant: Maria Lashon Hammond, Duluth, GA (US)

(72) Inventor: Maria Lashon Hammond, Duluth, GA (US)

( * ) Notice: Subject to any disclaimer, the term of this patent is extended or adjusted under 35 U.S.C. 154(b) by 150 days.

(21) Appl. No.: 18/387,030

(22) Filed: Nov. 4, 2023

(65) Prior Publication Data

US 2025/0143520 A1 May 8, 2025

(51) Int. Cl.
*A47K 10/02* (2006.01)
*A47G 9/02* (2006.01)
*A61H 37/00* (2006.01)

(52) U.S. Cl.
CPC ............ *A47K 10/02* (2013.01); *A47G 9/0223* (2013.01); *A61H 37/00* (2013.01)

(58) Field of Classification Search
CPC ...... A47K 10/02; A47G 9/0223; A47G 27/00; A61H 37/00; A61G 13/009
See application file for complete search history.

(56) References Cited

U.S. PATENT DOCUMENTS 1,990,568 A * 2/1935 Scheidler ............... A47K 7/022 601/143
4,051,845 A * 10/1977 Collins .................. A61B 46/23 128/855
4,493,866 A * 1/1985 Kim ........................ A45D 44/00 428/101
5,004,637 A * 4/1991 Liao ........................ A47K 10/02 428/43
10,362,908 B1 * 7/2019 Quinn .................... A47K 10/02
2002/0172797 A1 * 11/2002 Sugawara ............ A47G 11/006 428/100
2002/0192435 A1 * 12/2002 Poe, III .................. A47K 10/02 428/195.1
2006/0037555 A1 * 2/2006 Jackson ................. A01K 13/00 119/601
2006/0112490 A1 * 6/2006 Chausse ................. A61H 7/001 5/725
2006/0223037 A1 * 10/2006 Tanda ...................... G09B 1/00 434/245
2007/0251430 A1 * 11/2007 McDowell ........... A61G 13/009 108/90
2008/0205962 A1 * 8/2008 Doby Wilson ........ A47K 7/022 401/6
2019/0357692 A1 * 11/2019 Gallone ............... A47C 20/026
2020/0141533 A1 * 5/2020 Booth .................... A61G 13/10

* cited by examiner

*Primary Examiner* — George Sun

(57) ABSTRACT

The present invention discloses a massage towel, comprising a weighted portion and flipped portion. The weighted portion is designed to cover from the forearm to just above the hip line to be an added amenity. The flipped portion 4 and can be flipped from right to left sides of the shoulders of the client 3 while lying on a couch 1. The weighted massage towel 2 will keep the body at more desirable temp as the therapist 5 moves to work on the opposite side. The weighted portion is designed to cover from the forearm to just above the hip line to be an added amenity. The flipped portion can be flipped from right to left sides of the shoulders of the client while lying on a couch and is designed to keep the body at more desirable temp as the therapist moves to work on the opposite side.

3 Claims, 3 Drawing Sheets

MASSAGE TOWEL

TECHNICAL FIELD

This invention relates to the field of health and beauty and, more specifically, to a massage towel that is weighted to aid in a more relaxing experience during massage.

BACKGROUND ART

To regulate a more desirable temperature. As the massage therapist moves from one side of the body to the other, one half the body exposed and wet from the massage oil/lotion. It can be cold and uncomfortable. The weight of a towel is measured by the GSM (Grams per Square Metre). Low GSM (300-400) towels are light and thin whilst high GSM (450-600) towels are thicker and heavier. A towel that weighs less than 400 GSM is likely to be thin and typically suitable for a gym bag or trips to the beach.

Massage is a rapidly growing business all over the world. Most people get massages as often as 2-3 times a month. However, most customers find some breeze on the previously worked on portion of the body dissatisfying due to it being wet with the oil/lotion.

Using the weighted massage towel will keep the body at more desirable temp as the therapist moves to work on the opposite side.

The US patent application number U.S. Pat. No. 4,634,618A of 1985 describes a weighted towel that improves the ordinary beach towel or picnic blanket by providing a means to hold it secure in the wind. A hidden weighted cord sewn into the perimeter holds the material in place. The device may have an optional attached carry bag. The invention is safe and washable and easily carried.

However, this prior art is different from the proposed invention.

As such, there is need to develop a weighted towel designed to cover from the forearm to just above the hip line to be an added amenity.

OBJECTS OF THE INVENTION

The primary object of the invention is to regulate a more desire temperature during massage.

BRIEF DESCRIPTION OF THE DRAWING

The present invention will become more fully understood from the detailed description and the accompanying drawings. The drawings constitute a part of this specification and include exemplary embodiments of the invention, which may be embodied in various forms. It is to be understood that in some instances, various aspects of the invention may be shown exaggerated or enlarged to facilitate an understanding of the invention. Therefore, the drawings are not necessarily to scale. In addition, in the embodiments depicted herein, like reference numerals in the various drawings refer to identical or near identical structural elements.

The novel features believed to be characteristic of the illustrative embodiments are outlined in the accompanying drawings.

DESCRIPTION OF THE INVENTION

Figure 1:
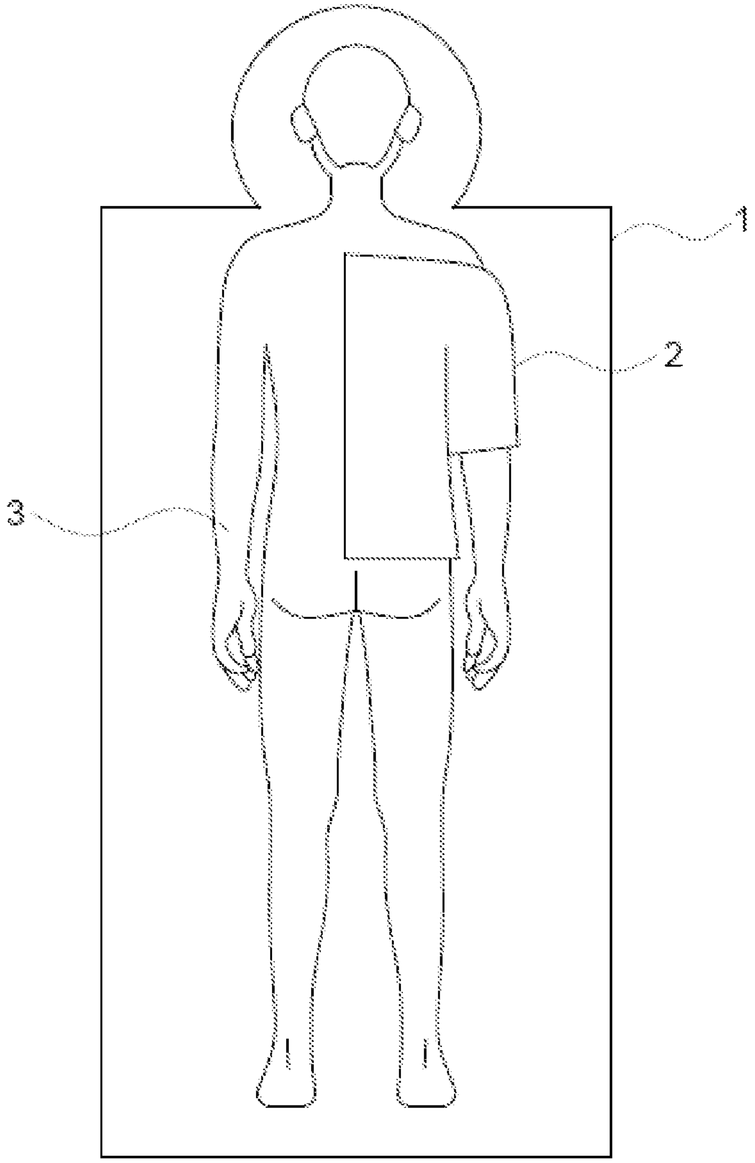
FIG. 1 shows a weighted massage towel as described in the present invention.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation. The following description of the preferred embodiment(s) is merely exemplary in nature and is in no way intended to limit the invention, its application, or uses.

Hereinafter, some embodiments of the present invention will be described in detail with reference to the accompanying drawings.

In the following description, like reference numerals designate like elements although the elements are shown in different drawings. Further, in the following description of the embodiments of the present invention, a detailed description of known functions and configurations incorporated herein will be omitted for clarity and brevity.

The present invention describes a weighted massage towel designed to regulate a more desirable temperature. As the massage therapist moves from one side of the body to the other, one half the body exposed and wet from the massage oil/lotion. It can be cold and uncomfortable. Using the weighted massage towel will keep the body at more desirable temp as the therapist moves to work on the opposite side.

Figure 2:
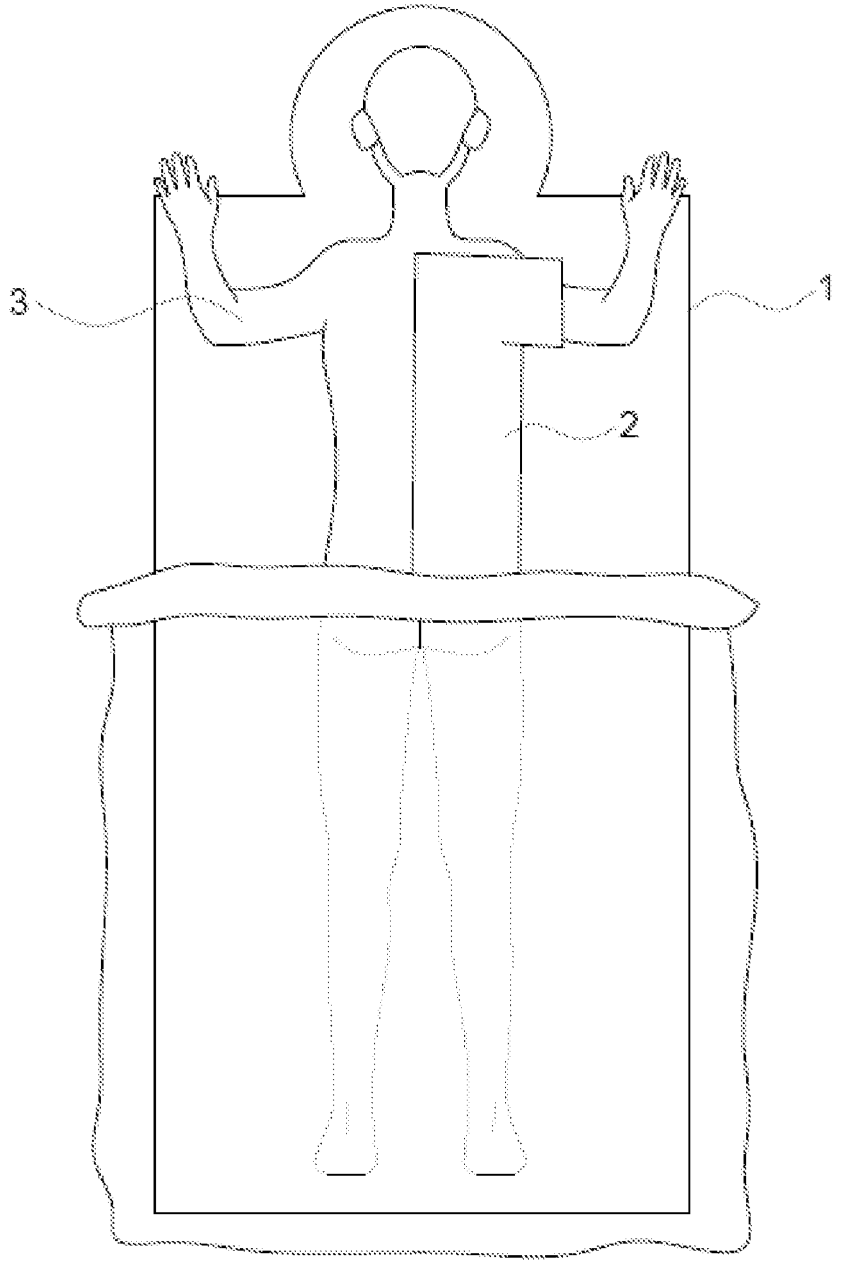
FIG. 2 shows a flipped portion of the weighted massage towel as described in the present invention.
Figure 3:
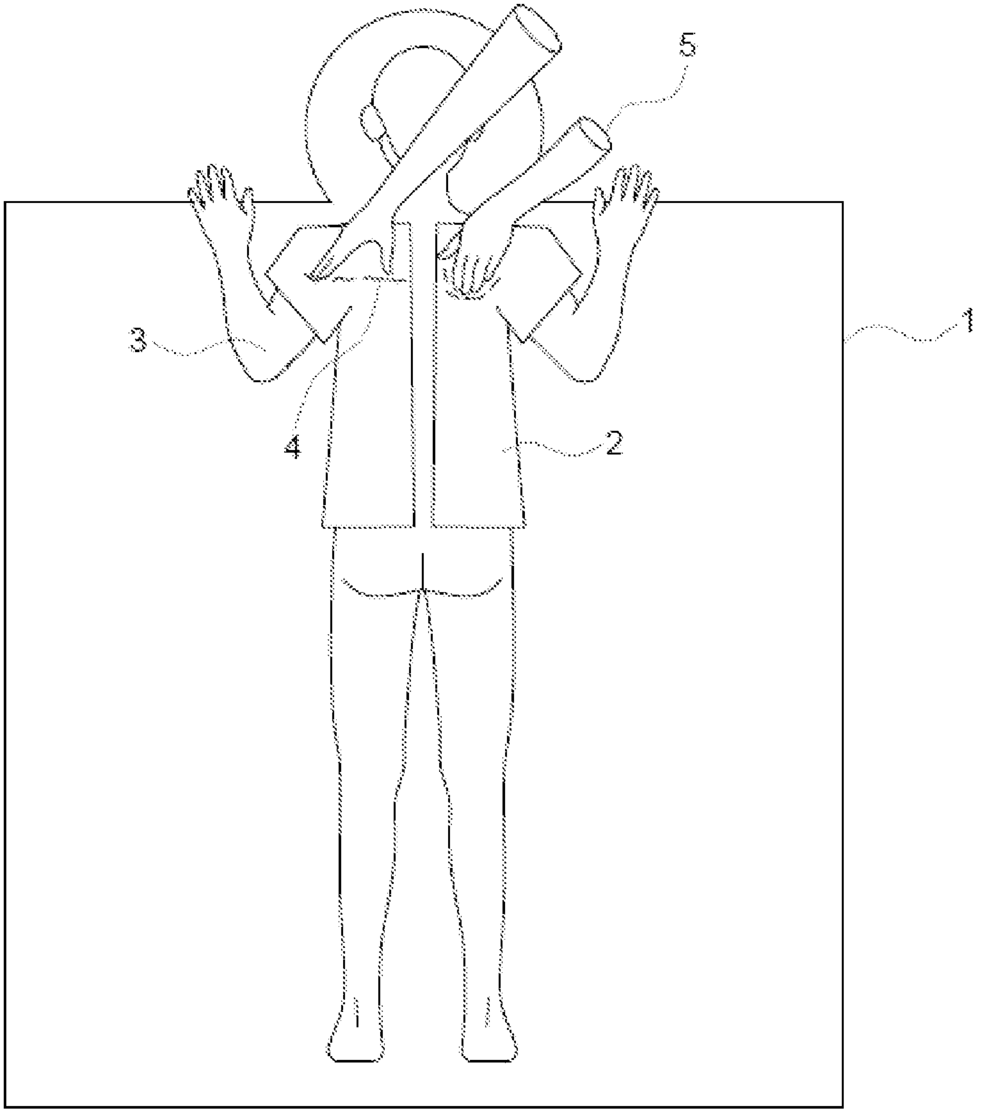
FIG. 3 shows a massage service using the weighted massage towel as described in the present invention.

In the first embodiment according to FIG. 1, the present in invention shows a weighted massage towel 2 covering the client 3 while on a couch 1. In FIG. 2, the invention presents a flipped portion of the weighted massage towel 2, client 3 and couch. In FIG. 3, the invention shows a massage service using the weighted massage towel 2. The flipped portion 4 and can be flipped from right to left sides of the shoulders of the client 3 while lying on a couch 1. The weighted massage towel 2 will keep the body at more desirable temp as the therapist 5 moves to work on the opposite side.

The present invention describes a massage towel, comprising a weighted portion and flipped portion. The weighted portion is designed to cover from the forearm to just above the hip line to be an added amenity. The flipped portion 4 and can be flipped from right to left sides of the shoulders of the client 3 while lying on a couch 1. The weighted massage towel 2 will keep the body at more desirable temp as the therapist 5 moves to work on the opposite side according to FIG. 3.

This weight towel is designed to aid in a more desired temperature to the previously massaged now wet (with oil/lotion) and exposed side of the body. It will cover from the forearm to just above the hip line.

Advantages

To aid in a more relaxing experience during massage.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting.

Thus, the breadth and scope of the present invention should not be limited by any of the above-described exemplary embodiments, but should be defined only in accordance with the following claims appended hereto and their equivalents.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICATION

The invention applies to health and beauty. The invention is a useful weighted massage towel designed to regulate a more desirable temperature. As the massage therapist moves from one side of the body to the other, one half the body exposed and wet from the massage oil/lotion. It can be cold and uncomfortable. Using the weighted massage towel will keep the body at more desirable temp as the therapist moves to work on the opposite side.

What is claimed:

1. A weighted massage towel, comprising:

a weighted portion, and a flipped portion, wherein the weighted portion is dimensioned to cover from a user above the user's hip line, wherein the weighted portion further is dimensioned to cover the user's forearm, wherein the weighted massage towel is shaped to accommodate the user's neck and head, wherein the weighted massage towel is dimensioned to substantially not extend beyond a width of a massage table, wherein the flipped portion can be flipped from the user's right shoulder to the user's left shoulder while the user lies on a surface.

2. The weighted massage towel according to claim 1, wherein the weighted massage towel is designed to keep a side of the user's body at a more desirable temperature while a therapist massages an opposite side of the user's body.

3. The weighted massage towel according to claim 2, wherein the weighted massage towel is further designed to provide a more desired temperature to the previously massaged now wet (with oil/lotion) and exposed side of the body.

* * * * *